United States Patent
Xu et al.

(10) Patent No.: US 10,019,966 B2
(45) Date of Patent: Jul. 10, 2018

(54) METHOD FOR DISPLAYING IMAGE AND APPARATUS THEREOF

(71) Applicant: Shenzhen China Star Optoelectronics Technology Co., Ltd., Shenzhen, Guangdong (CN)

(72) Inventors: Jing Xu, Guangdong (CN); Tai-Jiun Hwang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 313 days.

(21) Appl. No.: 15/025,344

(22) PCT Filed: Mar. 4, 2016

(86) PCT No.: PCT/CN2016/075570
§ 371 (c)(1),
(2) Date: Mar. 28, 2016

(87) PCT Pub. No.: WO2017/143629
PCT Pub. Date: Aug. 31, 2017

(65) Prior Publication Data
US 2018/0090100 A1    Mar. 29, 2018

(30) Foreign Application Priority Data
Feb. 22, 2016    (CN) .......................... 2016 1 0096691

(51) Int. Cl.
G09G 5/10         (2006.01)
G09G 3/3208       (2016.01)
G09G 3/20         (2006.01)

(52) U.S. Cl.
CPC .............. *G09G 5/10* (2013.01); *G09G 3/2003* (2013.01); *G09G 3/3208* (2013.01); *G09G 2320/0626* (2013.01); *G09G 2330/021* (2013.01)

(58) Field of Classification Search
CPC ...... G09G 5/10; G09G 3/2003; G09G 3/3208; G09G 2320/0626; G09G 2330/021
See application file for complete search history.

(56) References Cited

U.S. PATENT DOCUMENTS

2003/0098824 A1    5/2003  Kang et al.
2003/0146919 A1    8/2003  Kawashima et al.
2012/0062622 A1    3/2012  Koyama et al.

FOREIGN PATENT DOCUMENTS

CN    101399011 A    4/2009
CN    101751874 A    6/2010
(Continued)

*Primary Examiner* — Vijay Shankar
*Assistant Examiner* — Abhishek Sarma
(74) *Attorney, Agent, or Firm* — Andrew C. Cheng

(57) ABSTRACT

The present disclosure provides a method for displaying image and apparatus thereof, the method includes: When a first image in power saving mode needs to be switched to a second image, determining a difference of average picture level between the first image and the second image; according to a relationship between a preset difference of average picture level and a first time, determining the first time, and the first time is a time restoring a first brightness to a second brightness needed, the first brightness is a brightness of the first image in power saving mode, and the second brightness is a normal brightness of the second image; switching from the first image to the second image, and the brightness of the second image is gradually restored in the first time to the normal brightness. In this way, the human eye cannot bring discomfort and enhance the panel viewing comfort.

6 Claims, 6 Drawing Sheets

(56) References Cited

FOREIGN PATENT DOCUMENTS

| | | |
|---|---|---|
| CN | 101777310 A | 7/2010 |
| CN | 104240678 A | 12/2014 |

METHOD FOR DISPLAYING IMAGE AND APPARATUS THEREOF

FIELD OF THE DISCLOSURE

The present disclosure relates to a display technology field, and more particularly to a method for displaying an image and an apparatus thereof.

BACKGROUND OF THE DISCLOSURE

Since the OLED (Organic Light-Emitting Diode) simultaneously with self-luminous, no backlighting, high contrast, thin, wide viewing angle, fast response, flexibility panel can be used for a wide temperature range, structure and process is relatively simple and so on the outstanding feature, is considered the next generation of flat panel display technologies emerging applications.

Although the OLED panel has the outstanding feature, the OLED panel has the disadvantages also, such as: the power consumption of the OLED panel is higher and easy to aging. To solve this problem, a common solution is to determine by an Average Picture Level if the screen is static displaying the same image for a long time or not. If so, enter a power saving mode, and the brightness will be reduced gradually until the brightness reaches the preset value. When switching to another screen, the brightness will be returned to a normal state out of the power saving mode.

Although the method of above reduced the power consumption by reducing the brightness of the screen, when the screen jumped out of the power saving mode, the brightness increases suddenly, especially switch to highlight images. Thus, impact the human eye, discomfort, severe cases may cause damage to the human eye.

SUMMARY OF THE DISCLOSURE

The present disclosure is primarily to solve the technical problem is to provide a method for displaying an image and an apparatus thereof, cannot bring discomfort to the human eye and enhance the viewing comfort of the panel.

In order to solve the above problems, the technique used in the present disclosure is: providing a method for displaying an image, the method includes: when a first image in a power saving mode needs to be switched to a second image, determining a difference of an average picture level between the first image and the second image; according to a relationship between a preset difference of the average picture level and a first time, determining the first time, and the first time is a time restoring a first brightness to a second brightness needed, the first brightness is a brightness of the first image in the power saving mode, and the second brightness is a normal brightness of the second image; switching from the first image to the second image, and the brightness of the second image is gradually restored in the first time to the normal brightness; further, the relationship between the difference of the average picture level and the first time is a relationship of a linear function; or the relationship between the difference of the average picture level and the first time is a relationship of a parabolic function.

The step of the first image switched to the second image and the brightness of the second image gradually restored in the first time to the normal brightness includes: according to the first time t, determining a plurality of time nodes of the restored brightness, wherein $0 < i \leq t$; according to the relationship between the difference of the average picture level and the first time, calculating the difference of the average picture level for each time node $m_i$; according to the difference of the average picture level for each time node $m_i$, determining a brightness adjustment coefficient for each time node $\gamma_i$; according to the first image switched to the second image and the brightness adjustment coefficient $\gamma_i$, adjusting the brightness in the corresponding time nodes i until reaches the normal brightness.

Further, $\gamma_i = (n + m_i)/m$, n is the average picture level of the first image in the power saving mode, and m is the average picture level of the second image in the normal brightness.

In order to solve the above problems, another technique used in the present disclosure is: providing a method for displaying an image, the method includes: when a first image in a power saving mode needs to switched to a second image, determining a difference of an average picture level between the first image and the second image; according to a relationship between a preset difference of the average picture level and a first time, determining the first time, and the first time is a time restoring a first brightness to a second brightness needed, the first brightness is a brightness of the first image in the power saving mode, and the second brightness is a normal brightness of the second image; the first image is switched to the second image, and the brightness of the second image is gradually restored in the first time to the normal brightness.

Further, the relationship between the difference of the average picture level and the first time is a relationship of a linear function.

Further, the relationship between the difference of the average picture level and the first time is a relationship of a parabolic function.

Further, the step of the first image switched to the second image and the brightness of the second image gradually restored in the first time to the normal brightness includes: according to the first time t, determining a plurality of time nodes of the restored brightness, further, $0 < i \leq t$; according to the relationship between the difference of the average picture level and the first time, calculating the difference of the average picture level for each time node $m_i$; according to the difference of the average picture level for each time node $m_i$, determining a brightness adjustment coefficient for each time node $\gamma_i$; according to the first image switched to the second image and the brightness adjustment coefficient $\gamma_i$, adjusting the brightness in the corresponding time nodes i until reaches the normal brightness.

Further, $\gamma_i = (n + m_i)/m$, n is the average picture level of the first image in the power saving mode, and m is the average picture level of the second image in the normal brightness.

In order to solve the above problems, a further technique used in the present disclosure is: providing a displaying image apparatus, wherein the apparatus includes: a first determination module is used to determining a difference of an average picture level between a first image and a second image, when the first image in a power saving mode needs to switched to the second image; a second determination module is used to determining a first time based on a relationship between a preset difference of the average picture level and the first time, and the first time is a time restoring a first brightness to a second brightness needed, the first brightness is a brightness of the first image in the power saving mode, and the second brightness is a normal brightness of the second image; a switching restoration module is used to the first image switched to the second image and the brightness of the second image gradually restored in the first time to the normal brightness.

Further, the relationship between the difference of the average picture level and the first time is a relationship of a linear function.

Further, the relationship between the difference of the average picture level and the first time is a relationship of a parabolic function.

Further, the switching restoration module includes: a first determination unit is used to determines a plurality of time nodes of the restored brightness based on the first time t, wherein 0<i≤t; a computing unit is used to calculates the difference of the average picture level for each time node $m_i$ based on the relationship between the difference of the average picture level and the first time; a second determination unit is used to determines a brightness adjustment coefficient for each time node $\gamma_i$ based on the difference of the average picture level for each time node $m_i$; a switching adjustment unit is used to adjusts the brightness in the corresponding time nodes i based on the first image switched to the second image and the brightness adjustment coefficient $\gamma_i$ until reaches the normal brightness.

Further, $\gamma_i=(n+m_i)/m$, n is the average picture level of the first image in the power saving mode, and m is the average picture level of the second image in the normal brightness.

The beneficial effects of the present disclosure are: the situation is different from the prior art, when a first image in a power saving mode needs to be switched to a second image, determining a difference of an average picture level between the first image and the second image; according to a relationship between a preset difference of the average picture level and a first time, determining the first time, and the first time is a time restoring a first brightness to a second brightness needed, the first brightness is a brightness of the first image in the power saving mode, and the second brightness is a normal brightness of the second image; switching from the first image to the second image, and the brightness of the second image is gradually restored in the first time to the normal brightness. Since the luminance of the second image is gradually returning to normal brightness in the first time, in this way, the human eye cannot bring discomfort and enhance the viewing comfort of the panel.

DETAILED DESCRIPTION OF PREFERRED EMBODIMENTS

The accompanying drawings and the following embodiments of the present invention will be described in detail.

Figure 1:
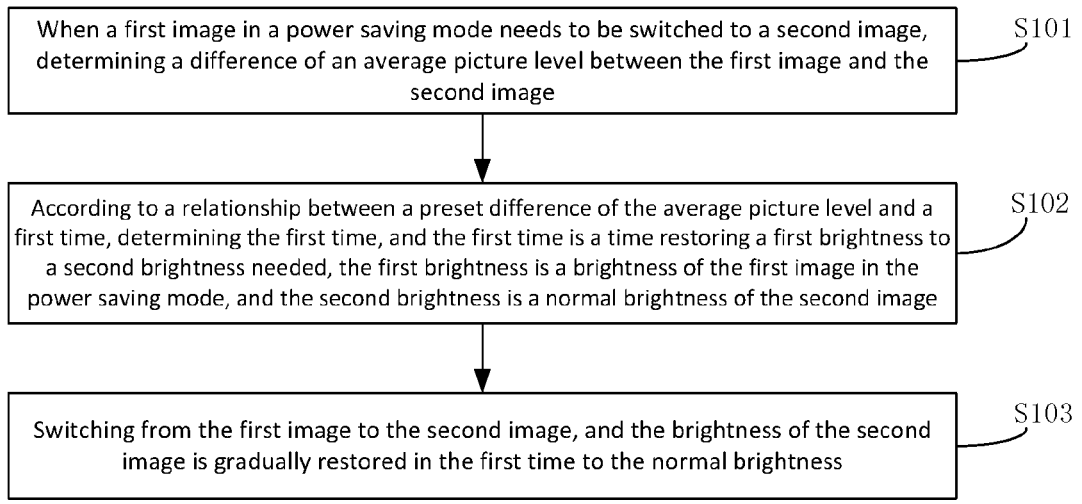
FIG. 1 is a flow chart of an embodiment of the method for displaying the image of the present disclosure.

Referring to FIG. 1, FIG. 1 is a flow chart of an embodiment of the method for displaying the image of the present disclosure, including:

Step S101: when a first image in a power saving mode needs to be switched to a second image, determining a difference of an average picture level between the first image and the second image.

The average picture level (APL) represents the brightness of an image. The difference of the average picture level between the first image and the second image, i.e. a difference of the brightness between the first image and the second image. The first image in the power saving mode, and its brightness is usually relatively lower, and a period of time after the first image switches to the second image, the second image is not in the power saving mode, its brightness is the brightness in the normal state (i.e. non-saving mode), thus, the difference of the average picture level between the first image and the second image is usually higher.

Step S102: according to a relationship between a preset difference of the average picture level and a first time, the first time is determined, and the first time is a needed time restoring from a first brightness to a second brightness. The first brightness is a brightness of the first image in the power saving mode, and the second brightness is a normal brightness of the second image.

The first time is the needed time which the brightness of the first image in the power saving mode restoring to the normal brightness of the second image. The relationship between the difference of the average picture level and the first time can be set in advance, the relationship can be determined based on user eye and the empirical data, and can be determined in accordance with a predetermined gradient mode, or in accordance with the different sensitivity of the human eye, at different time periods using different relationship to be determined. Overall, the time of the brightness of the first image in the power saving mode restoring to the normal brightness of the second image needed is a period of time, i.e. the brightness in the first time is restoring gradually, but is not directly rising from the first brightness to the second brightness.

Step S103: switching from the first image to the second image, and the brightness of the second image is gradually restored in the first time to the normal brightness.

Switching from the first image to the second image, and the brightness of the second image is gradually restored in the first time to the normal brightness. Because the brightness is gradually restored, it will not bring the human eye discomfort.

Figure 2:
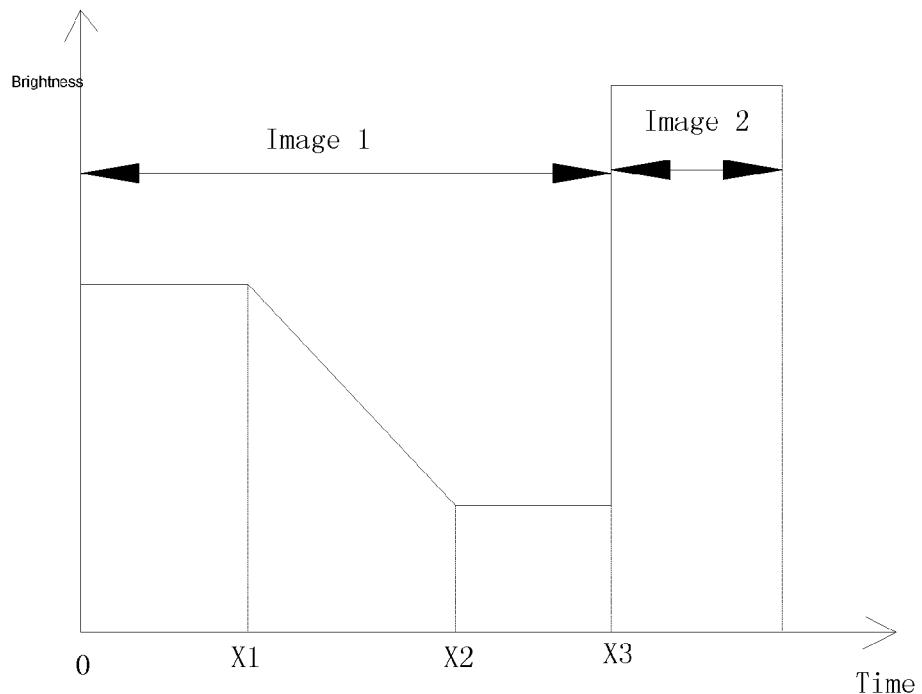
FIG. 2 is a schematic diagram of the image 1 switching to the image 2 in the prior art.
Figure 3:
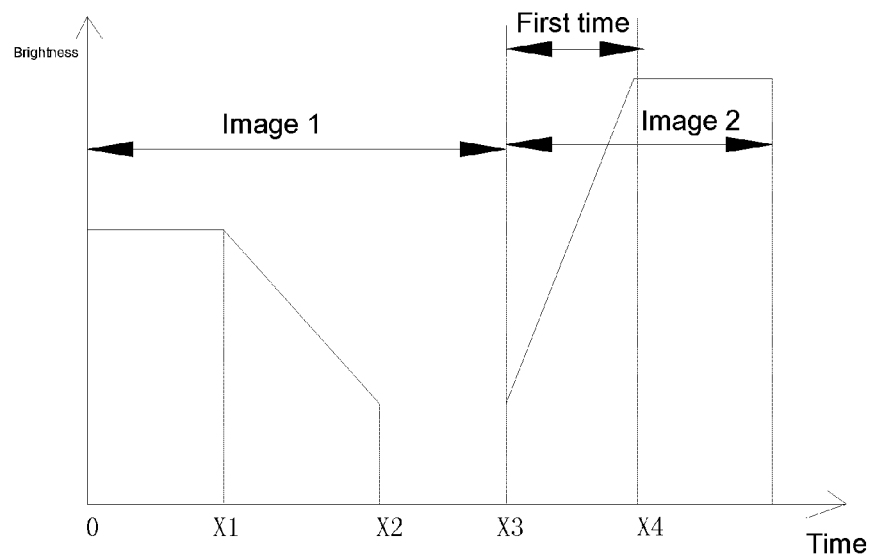
FIG. 3 is a schematic diagram of the image 1 switching to the image 2 in the embodiment of the method for displaying the image of the present disclosure.

Referring to FIGS. 2 and 3, FIG. 2 is a schematic diagram of the image 1 switching to the image 2 in the prior art. FIG. 3 is a schematic diagram of the image 1 switching to the image 2 in the embodiment of the method for displaying the image of the present disclosure. When the image goes into a power saving mode, the brightness variation are: after the static images displayed for a period of time (i.e. time period 0-X1), and enter a power saving mode, the brightness is reduced linearly (between X1-X2 period). After the brightness reaches a predetermined value (X2 after), the brightness never changes. When the image 1 is switched from the power-saving mode to the image 2, referring to FIG. 2, in the prior art, the brightness is directly restored to the normal brightness of the current image 2 (X3). Referring to FIG. 3, in the method of the present disclosure, the brightness of the image 2 gradually increases to reach the normal brightness within the specified time (X3-X4).

When a first image in a power saving mode needs to be switched into a second image, a difference of an average picture level is determined between the first image and the second image; according to a relationship between a preset difference of the average picture level and a first time, the first time is determined, and the first time is a needed time restoring from a first brightness to a second brightness. The first brightness is a brightness of the first image in the power saving mode, and the second brightness is a normal brightness of the second image; switching from the first image to the second image, and the brightness of the second image gradually restores in the first time to the normal brightness. Since the luminance of the second image returns gradually to normal brightness in the first time, in this way, the human eye cannot bring discomfort and enhance the viewing comfort of the panel.

Figure 4:
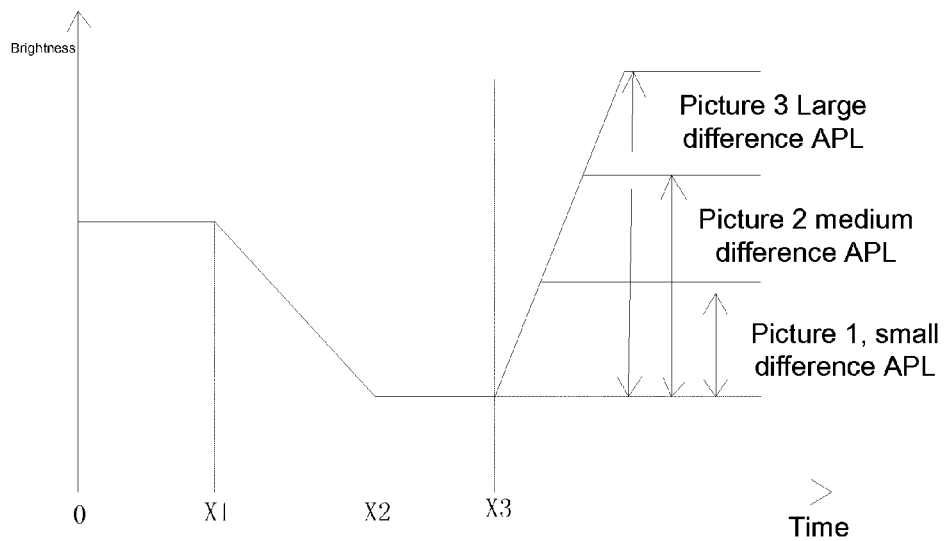
FIG. 4 is a schematic diagram of the relationship between the difference of the average picture level and the first time is a relationship of a linear function in the embodiment of the method for displaying the image of the present disclosure.

Further, the relationship between the difference of the average picture level and the first time is a relationship of a linear function. Referring to FIG. 4, the relationship between the difference of the APL and the first time is a relationship of a linear function. When the slope is fixed, and the difference of the APL around two images is low, the restored time of the brightness is short; when the difference of the APL around two images is high, the restored time of the brightness is long.

Certainly, the first time can also be divided into two periods, the linear function of the first slope is used in the preceding period, and the linear function of the second slope is used in the subsequent period.

In practice, in the case of both the human eye comfort, but also according to different needs, the linear function with different slopes are used. When the brightness in the power saving mode is restored to the normal brightness, the time of the large slope of the linear function is shorter than the time of the small slope of the linear function.

Figure 5:
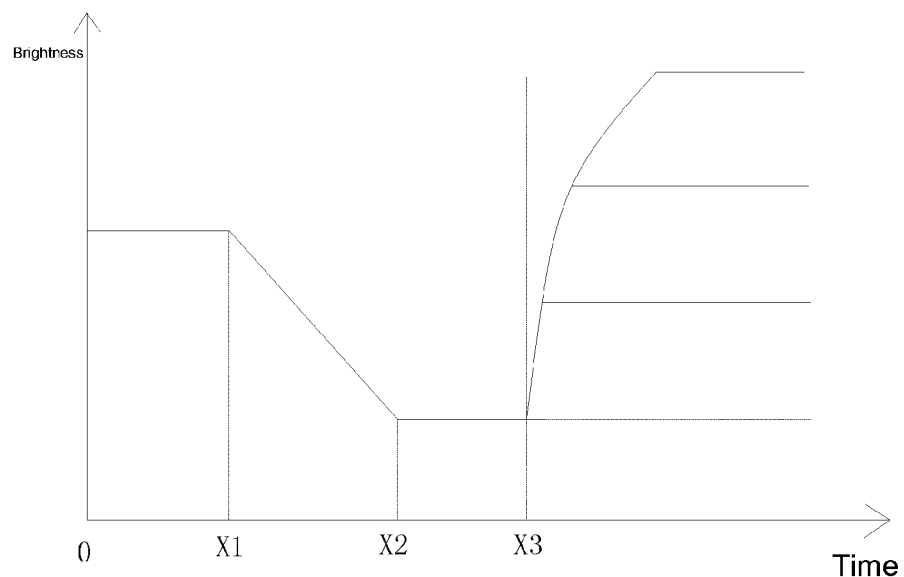
FIG. 5 is a schematic diagram of the relationship between the difference of the average picture level and the first time is a relationship of a parabolic function in the embodiment of the method for displaying the image of the present disclosure.

The relationship between the difference of the average picture level and the first time is a relationship of a parabolic function. Referring to FIG. 5, starting from X3, the brightness is gradually enhanced based on the parabolic function, when the difference of the APL is low, the brightness can be restored more quickly.

Figure 6:
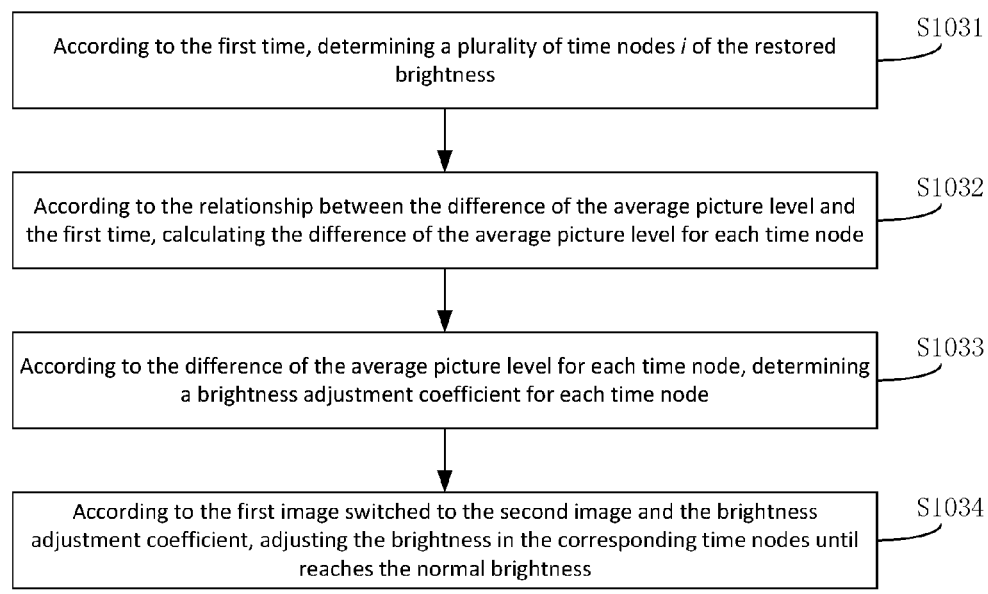
FIG. 6 is a flow chart of another embodiment of the method for displaying the image of the present disclosure.

Referring to FIG. 6, the step S103 can includes: a sub-step S1031, a sub-step S1032, a sub-step S1033 and a sub-step S1034.

Sub-step S1031: according to the first time t, determines a plurality of time nodes i of the restored brightness, further, $0 < i \leq t$.

Sub-step S1032: according to the relationship between the difference of the average picture level and the first time, calculate the difference of the average picture level for each time node $m_i$.

Sub-step S1033: according to the difference of the average picture level for each time node $m_i$, determine a brightness adjustment coefficient for each time node $\gamma_i$.

Each brightness adjustment coefficient is determined by the brightness of the first image in the power saving mode, the normal brightness of the second image and the difference of the average picture level for each time node $m_i$. Specifically, may be determined by the practical application.

In an embodiment, the relationship between the difference of the average picture level and the first time is a relationship of a linear function. $\gamma_i = (n+m_i)/m$, n is the average picture level of the first image in the power saving mode, and m is the average picture level of the second image in the normal brightness.

Sub-step S1034: according to the first image switched to the second image and the brightness adjustment coefficient $\gamma_i$, adjust the brightness in the corresponding time nodes i until reaches the normal brightness.

Figure 7:
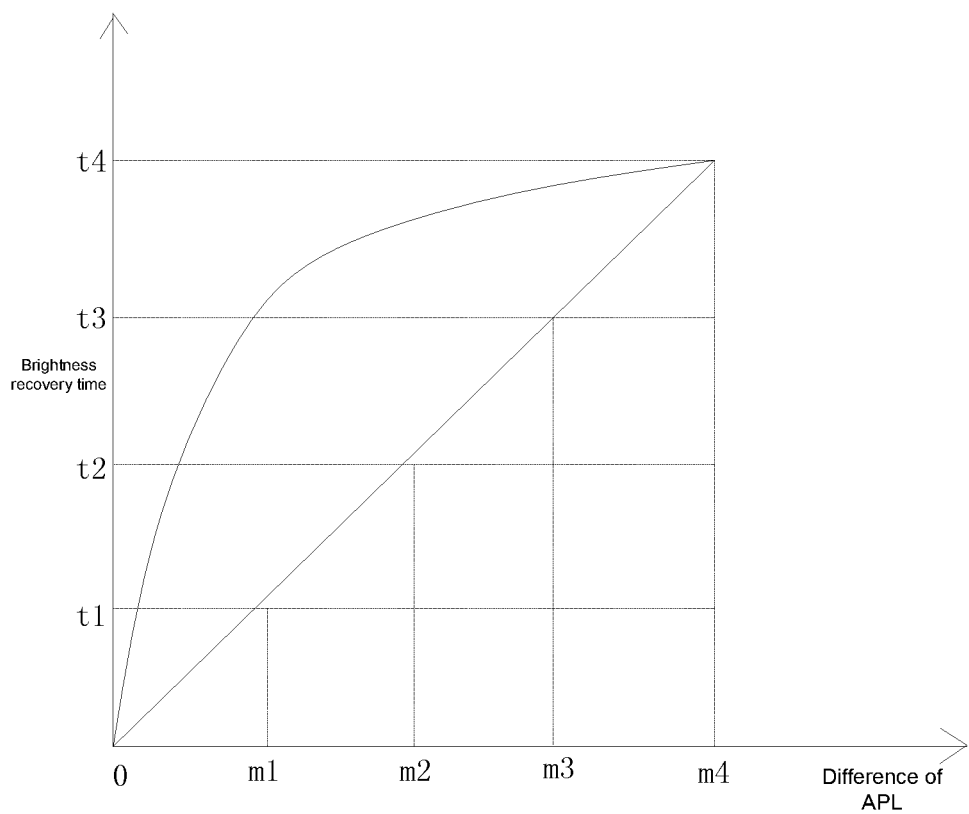
FIG. 7 is a schematic diagram of the brightness adjustment when the relationship between the difference of the average picture level and the first time is a relationship of a linear function in the embodiment of the method for displaying the image of the present disclosure.

Such as: referring to FIG. 7, the linear function as an example, let the value of the APL of the image 1 in the power saving mode be n, the corresponding color components be (R, G, B) and the value of the APL of the image 2 in the normal brightness be m. dividing the first time into four time nodes $t_1$, $t_2$, $t_3$, $t_4$ and let the corresponding difference of the APL be $m_1$, $m_2$, $m_3$, $m_4$.

At the time 0 (i.e. switching to image 2), the corresponding color components are ($R_0$, $G_0$, $B_0$) and the data of the image 2 is processed:

$$R_0 = \frac{R*n}{m}$$

$$G_0 = \frac{G*n}{m}$$

$$B_0 = \frac{B*n}{m}$$

At the time node $t_1$, the corresponding color components are ($R_1$, $G_1$, $B_1$) and the data of the image 2 is processed:

$$R_1 = \frac{R*(n+m_1)}{m}$$

$$G_1 = \frac{G*(n+m_1)}{m}$$

$$B_1 = \frac{B*(n+m_1)}{m}$$

At the time node $t_2$, the corresponding color components are ($R_2$, $G_2$, $B_2$) and the data of the image 2 is processed:

$$R_2 = \frac{R*(n+m_2)}{m}$$

$$G_2 = \frac{G*(n+m_2)}{m}$$

$$B_2 = \frac{B*(n+m_2)}{m}$$

At the time node $t_3$, the corresponding color components are ($R_3$, $G_3$, $B_3$) and the data of the image 2 is processed:

$$R_3 = \frac{R*(n+m_3)}{m}$$

$$G_3 = \frac{G*(n+m_3)}{m}$$

$$B_3 = \frac{B*(n+m_3)}{m}$$

At the time node $t_4$, the corresponding color components are ($R_4$, $G_4$, $B_4$) and the data of the image 2 is processed:

$$R_4 = \frac{R*(n+m_4)}{m}$$

$$G_4 = \frac{G*(n+m_4)}{m}$$

$$B_4 = \frac{B*(n+m_4)}{m}$$

Since the n+m4 equal to m, in the time node $t_4$, the image 2 is displayed normally. By the above-described manner, the gradually increased brightness can be achieved.

It should be noted that the setting time nodes are not limited in the above-mentioned four; said brightness is adjusted by the process of the digital data, but it is not limited in this method. It can also be achieved by gamma voltage.

Figure 8:
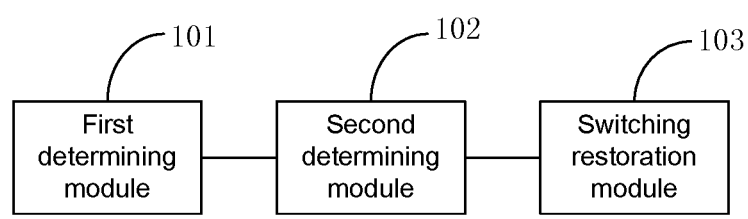
FIG. 8 is a schematic of an embodiment of the displaying image apparatus of the present disclosure.

Referring to FIG. 8, FIG. 8 is a schematic of an embodiment of the displaying image apparatus of the present disclosure. The apparatus of the present embodiment can perform the above steps in the method, described in the detail content, and please refer to the above methods section. This is no longer dwell.

The apparatus includes: a first determination module 101, a second determination module 102 and a switching restoration module 103.

The first determination module 101 is used to determine the difference of the average picture level between the first image and the second image, when the first image in the power saving mode needs to switched to the second image.

the second determination 102 module is used to determine the first time based on the relationship between the preset difference of the average picture level and the first time, and the first time is the needed time restoring the first brightness to a second brightness, the first brightness is the brightness of the first image in the power saving mode, and the second brightness is the normal brightness of the second image.

The switching restoration module 103 is used to switch the first image to the second image and the brightness of the second image gradually restored in the first time to the normal brightness.

When a first image in a power saving mode needs to be switched to a second image, determine a difference of an average picture level between the first image and the second image; according to a relationship between a preset difference of the average picture level and a first time, determine the first time, and the first time is a time restoring a first brightness to a second brightness needed, the first brightness is a brightness of the first image in the power saving mode, and the second brightness is a normal brightness of the second image; switch from the first image to the second image, and the brightness of the second image is gradually restored in the first time to the normal brightness. Since the luminance of the second image gradually returns to normal brightness in the first time, in this way, the human eye cannot bring discomfort and enhance the viewing comfort of the panel.

Further, the relationship between the difference of the average picture level and the first time is a relationship of a linear function.

Further, the relationship between the difference of the average picture level and the first time is a relationship of a parabolic function.

Figure 9:
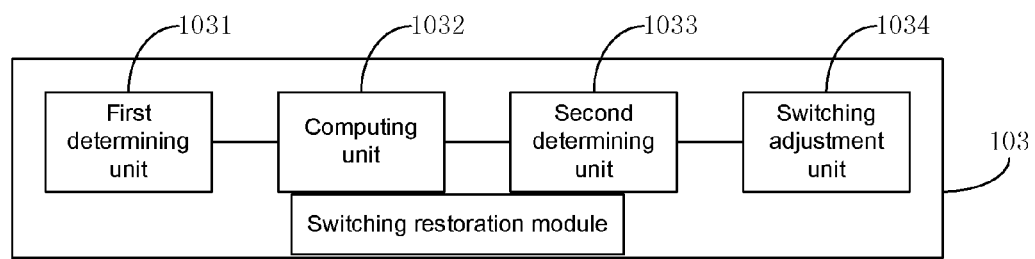
FIG. 9 is a schematic of another embodiment of the displaying image apparatus of the present disclosure.

Further, referring to FIG. 9, the switching restoration module 103 includes: a first determination unit 1031, a computing unit 1032, a second determination unit 1033 and a switching adjustment unit 1034.

The first determination unit is used to determine a plurality of time nodes of the restored brightness based on the first time t, wherein 0<i≤t.

The computing unit is used to calculate the difference of the average picture level for each time node $m_i$ based on the relationship between the difference of the average picture level and the first time.

The second determination unit is used to determine a brightness adjustment coefficient for each time node $\gamma_i$ based on the difference of the average picture level for each time node $m_i$.

The switching adjustment unit is used to adjust the brightness in the corresponding time nodes i based on the first image switched to the second image and the brightness adjustment coefficient $\gamma_i$ until the image reaches the normal brightness.

Further, $\gamma_i=(n+m_i)/m$, n is the average picture level of the first image in the power saving mode, and m is the average picture level of the second image in the normal brightness.

The above are only embodiments of the present disclosure is not patented and therefore limit the scope of the present disclosure, any use of the contents of the present specification and drawings made equivalent or equivalent structural transformation process, either directly or indirectly, use the other relevant technical fields are included in the patent empathy scope of the disclosure.

What is claimed is:

1. A method for displaying an image, wherein the method comprises:
   when a first image in a power saving mode needs to be switched to a second image, determining a difference of an average picture level between the first image and the second image;
   according to a relationship between a preset difference of the average picture level and a first time, determining the first time, and the first time is a time restoring a first brightness to a second brightness needed, the first brightness is a brightness of the first image in the power saving mode, and the second brightness is a normal brightness of the second image;
   switching from the first image to the second image, and the brightness of the second image is gradually restored in the first time to the normal brightness;
   wherein, the relationship between the difference of the average picture level and the first time is a relationship of a linear function; or the relationship between the difference of the average picture level and the first time is a relationship of a parabolic function;
   wherein a step of the first image switched to the second image and the brightness of the second image gradually restored in the first time to the normal brightness comprises:
   according to the first time t, determining a plurality of time nodes of the restored brightness, wherein 0<i≤t;
   according to the relationship between the difference of the average picture level and the first time, calculating the difference of the average picture level for each time node $m_i$;
   according to the difference of the average picture level for each time node $m_i$, determining a brightness adjustment coefficient for each time node $\gamma_i$;
   according to the first image switched to the second image and the brightness adjustment coefficient $\gamma_i$, adjusting the brightness in the corresponding time nodes i until reaches the normal brightness.

2. The method for displaying an image according to claim 1, wherein $\gamma_i=(n+m_i)/m$, n is the average picture level of the first image in the power saving mode, and m is the average picture level of the second image in the normal brightness.

3. A method for displaying an image, wherein the method comprises:
  when a first image in a power saving mode needs to be switched to a second image, determining a difference of an average picture level between the first image and the second image;
  according to a relationship between a preset difference of the average picture level and a first time, determining the first time, and the first time is a time restoring a first brightness to a second brightness needed, the first brightness is a brightness of the first image in the power saving mode, and the second brightness is a normal brightness of the second image;
  the first image is switched to the second image, and the brightness of the second image is gradually restored in the first time to the normal brightness;
  wherein the relationship between the difference of the average picture level and the first time is a relationship of a linear function;
  wherein the relationship between the difference of the average picture level and the first time is a relationship of a parabolic function;
  wherein a step of the first image switched to the second image and the brightness of the second image gradually restored in the first time to the normal brightness comprises:
    according to the first time t, determining a plurality of time nodes of the restored brightness, wherein $0<i\leq t$;
    according to the relationship between the difference of the average picture level and the first time, calculating the difference of the average picture level for each time node $m_i$;
    according to the difference of the average picture level for each time node $m_i$, determining a brightness adjustment coefficient for each time node $\gamma_i$;
    according to the first image switched to the second image and the brightness adjustment coefficient $\gamma_i$, adjusting the brightness in the corresponding time nodes i until reaches the normal brightness.

4. The method for displaying an image according to claim 3, wherein $\gamma_i=(n+m_i)/m$ n is the average picture level of the first image in the power saving mode, and m is the average picture level of the second image in the normal brightness.

5. A displaying image apparatus, wherein the apparatus comprises:
  a first determination module used to determine a difference of an average picture level between a first image and a second image, when the first image in a power saving mode needs to switched to the second image;
  a second determination module used to determine a first time based on a relationship between a preset difference of the average picture level and the first time, and the first time is a time restoring a first brightness to a second brightness needed, the first brightness is a brightness of the first image in the power saving mode, and the second brightness is a normal brightness of the second image;
  a switching restoration module used to determine the first image switched to the second image and the brightness of the second image gradually restored in the first time to the normal brightness;
  wherein the relationship between the difference of the average picture level and the first time is a relationship of a linear function
  wherein the relationship between the difference of the average picture level and the first time is a relationship of a parabolic function;
  wherein the switching restoration module comprises:
    a first determination unit used to determine a plurality of time nodes of the restored brightness based on the first time t, wherein $0<i\leq t$;
    a computing unit used to calculate the difference of the average picture level for each time node $m_i$ based on the relationship between the difference of the average picture level and the first time;
    a second determination unit used to determine a brightness adjustment coefficient for each time node $\gamma_i$ based on the difference of the average picture level for each time node $m_i$;
    a switching adjustment unit used to adjust the brightness in the corresponding time nodes i based on the first image switched to the second image and the brightness adjustment coefficient $\gamma_i$ until reaches the normal brightness.

6. The displaying image apparatus according to claim 5, wherein $\gamma_i=(n+m_i)/m$, n is the average picture level of the first image in the power saving mode, and m is the average picture level of the second image in the normal brightness.

* * * * *